United States Patent [19]

St. Martin

[11] Patent Number: 5,014,596

[45] Date of Patent: May 14, 1991

[54] REMOTE CONTROL MODIFICATION FOR MANUALLY CONTROLLED HYDRAULIC SYSTEMS

[76] Inventor: Louis G. St. Martin, 970-1 Circle St., Wenatchee, Wash. 98801

[21] Appl. No.: 372,793

[22] Filed: Jun. 28, 1989

[51] Int. Cl.$^5$ .............................................. F01B 25/02
[52] U.S. Cl. ........................................... 91/6; 91/427; 91/527; 91/461
[58] Field of Search ...................... 91/6, 427, 525, 527, 91/461, 403

[56] References Cited

U.S. PATENT DOCUMENTS

| | | | |
|---|---|---|---|
| 2,635,584 | 9/1950 | Jacques | 91/461 |
| 3,795,110 | 3/1974 | Kobelt | 91/427 |
| 3,800,671 | 4/1974 | Coleman et al. | 91/461 |
| 3,892,079 | 7/1975 | Hirano | 91/527 |
| 4,166,506 | 9/1979 | Tezuka et al. | 91/461 |
| 4,286,502 | 9/1981 | Bianchetta et al. | 91/461 |
| 4,736,673 | 4/1988 | Harada et al. | 91/527 |
| 4,761,954 | 8/1988 | Rosman | 91/461 |
| 4,770,083 | 9/1988 | Johnson | 91/461 |
| 4,779,418 | 10/1988 | Artzberger . | |
| 4,809,586 | 3/1989 | Gage et al. | 91/461 |

OTHER PUBLICATIONS

Hydraulics and Pneumatics, vol. 16, No. 6 (Jun. 1963), p. 81.

*Primary Examiner*—John T. Kwon
*Assistant Examiner*—F. Daniel Lopez
*Attorney, Agent, or Firm*—Christensen, O'Connor, Johnson & Kindness

[57] ABSTRACT

A remote control modification (11) for a hydraulic steering system (13) of the type used to steer underground loaders and the like is disclosed. The remote control modification comprises a bidirectional, spring-loaded remote control valve (51) connected in parallel with the bidirectional, spring-loaded control valve (19) that normally responds to steering inputs created by the manual movement of a steering arm (25). The remote control valve (51) has outlet ports (75 and 77) that are smaller than the outlet ports (39 and 41) of the manual control valve (19). Movement of the piston of the remote control valve (51) is controlled by a slave hydraulic actuator (53). The flow of hydraulic fluid to the slave hydraulic actuator (53) is controlled by a solenoid-actuated valve (59). The solenoid (61) of the solenoid-operated valve (59), in turn, is controlled by a receiver (63) that responds to radio frequency control signals (105) generated by a remotely located transmitter (65). Located in the hydraulic lines between the solenoid-operated valve (59) and the slave hydraulic actuator (53) are restrictor/reverse bypass pressure relief valve combinations (55 and 57). Finally, preferably, the hydraulic line running to the larger capacity chamber of the slave hydraulic actuator (53), i.e., the non-shaft chamber, is coupled to the hydraulic return tank via a relief line that contains a manually adjustable restrictor valve (67).

19 Claims, 1 Drawing Sheet

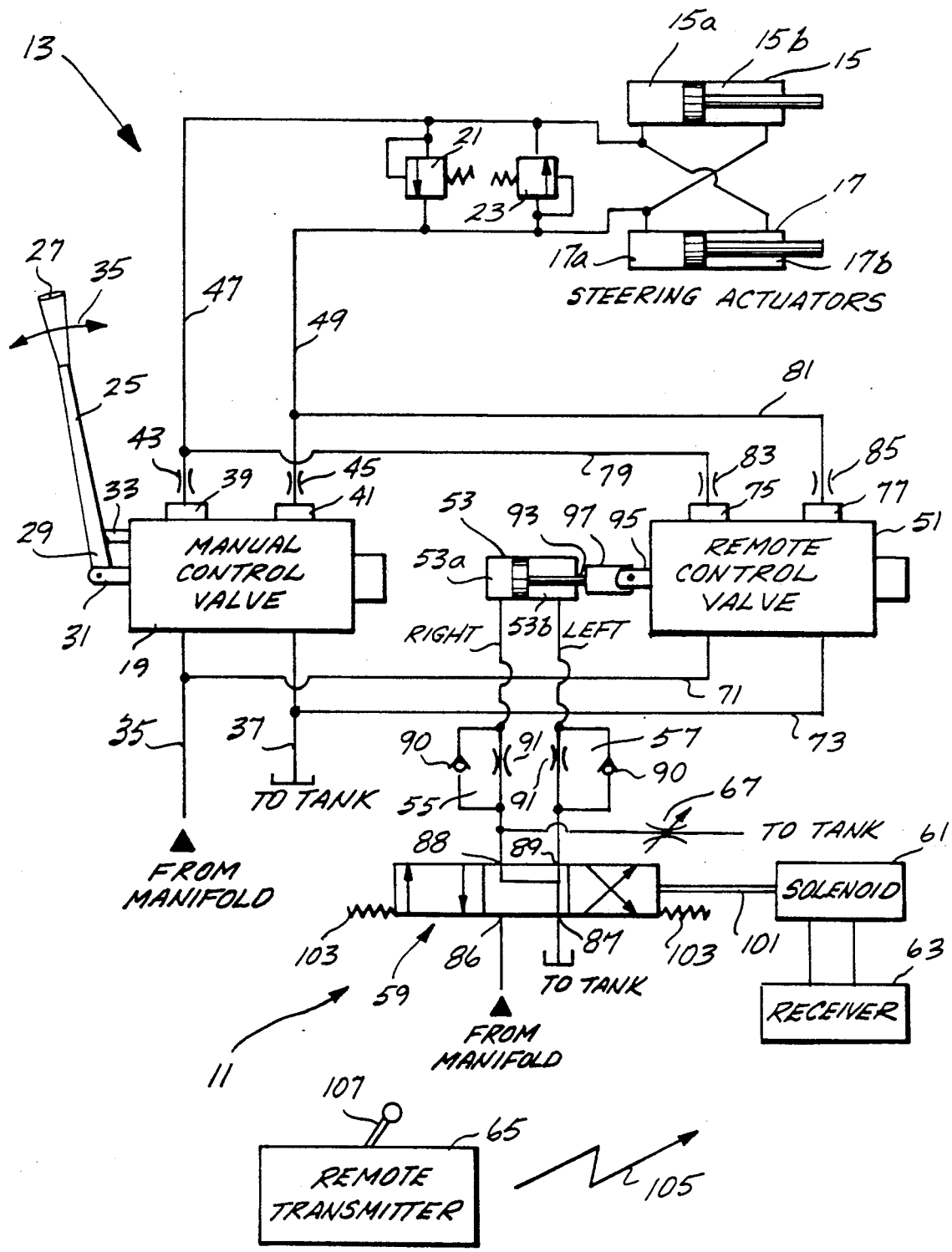

REMOTE CONTROL MODIFICATION FOR MANUALLY CONTROLLED HYDRAULIC SYSTEMS

TECHNICAL AREA

This invention relates to hydraulic systems and, more particularly, remote control devices for hydraulic systems that have previously been manually controlled.

BACKGROUND OF THE INVENTION

While the present invention was developed for use in connection with hydraulic steering systems used on underground loaders, i.e., loaders used to load minerals and ores in underground mines, and as described in combination with an underground loader hydraulic steering mechanism, it is to be understood that the invention can also be utilized in other types of hydraulic control systems, particularly hydraulic control systems that respond to manual inputs applied via a control valve.

The type of underground loader that the invention was developed to be used with includes a forward section and an aft section hinged together about a vertical axis. The forward section supports a pair of forward wheels and the rear of aft section supports a pair of rear wheels. Steering is accomplished by a pair of hydraulic actuators mounted between the fore and aft sections of the loader. The hydraulic actuators are located on opposite sides of the hinge axis. Steering is accomplished by extending the rod of one of the hydraulic actuators and retracting the rod of the other hydraulic actuator to cause a rotation of one section of the loader with respect to the other section, about the vertical hinge axis. As a result, a greater displacement is created between the wheels located on one side of the loader and the wheels located on the other side, causing the underground loader to turn when power is applied to the drive wheels.

In the past, underground loader hydraulic steering systems have been manually controlled by an operator moving a lever arm that controls the position of the piston of a bidirectional, spring-loaded hydraulic control valve. When the lever is pulled in one direction, hydraulic fluid pressure is applied to the chamber on one side of the piston of one of the hydraulic steering actuators and to the chamber on the other side of the piston of the other steering actuator. Further, the manually controlled valve opens a pathway for fluid located in the nonpressurized chambers of the hydraulic actuators to flow to a hydraulic fluid reservoir, i.e., a tank. Movement of the lever arm in the opposite direction causes the opposite result, i.e., the manually actuated hydraulic control valve applies hydraulic fluid pressure to the chambers located on the previously unpressurized sides of the pistons of the hydraulic steering actuators and opens a pathway for fluid located in the previously pressurized chambers to return to the tank. In most cases, pressure relief valves are mounted between the lines running from the manually actuated hydraulic control valve to the steering hydraulic actuators to prevent the application of excessive pressure to the hydraulic steering actuator chambers.

In recent years, attempts have been made to remotely control the steering of underground loaders. In most instances, the attempts have focused on providing a remote control system for controlling the position of the lever arm moved by the operator to provide manual steering control. Unfortunately, these attempts have not been as successful as desired. This is primarily due to the fact that loaders are operated at idle, full speed, or half speed. In-between speeds are not available. Remote control systems designed to control the position of the hydraulic control valve used for manual control have proven to be inadequate because they are unable to respond quickly enough to prevent loader over and understeering. Over and understeering can result in loaders slamming into nearby objects, which is destructive to equipment as well as dangerous to nearby personnel. The present invention is directed to providing a remote control modification that is responsive enotgh to greatly diminish, if not completely avoid, this problem.

SUMMARY OF THE INVENTION

In accordance with this invention a remote control modification for a hydraulic steering system of the type used to steer underground loaders and the like is provided. The remote control modification comprises a bidirectional, spring-loaded remote control valve connected in parallel with the bidirectional, spring-loaded manual control valve that responds to steering inputs created by the manual movement of a steering arm or similar device. The remote control valve has outlet orifices that are smaller than the outlet orifices of the manual control valve. Movement of the piston of the remote control valve is controlled by a slave hydraulic actuator. The flow of fluid to the slave hydraulic actuator is controlled by an electrically actuated valve. The electrical actuator, i.e., solenoid, of the solenoid actuated valve is controlled by a receiver that responds to radio frequency control signals generated by a remotely located transmitter. The electrically actuated valve is a three-position valve that is spring-loaded to a neutral position.

In accordance with further aspects of this invention, located in the hydraulic lines between the electrically actuated valve and the slave hydraulic actuator are restrictor/reverse bypass pressure relief valve combinations, i.e., a combination formed by a restrictor and pressure relief valve mounted in parallel with the pressure relief valve oriented so as to allow hydraulic fluid to flow in the reverse direction (from the slave hydraulic actuator toward the electrically actuated valve). The reverse bypass pressure relief valve portion of the combinations allows the piston of the slave hydraulic actuator to rapidly move to a neutral position in response to the spring force of the remote control valve when the electrically actuated valve is moved to a position (neutral) that connects both sides of the slave hydraulic actuator to the hydraulic fluid reservoir, i.e., tank.

In accordance with still further aspects of this invention, the hydraulic line running to the larger capacity chamber of the slave hydraulic actuator (i.e., the chamber through which the shaft of the slave hydraulic actuator does not pass) is coupled to the hydraulic fluid tank via a relief line. Preferably, the relief line contains a manually adjustable restrictor.

It has been found that a remote control modification for a hydraulic steering system of the type contemplated by the present invention avoids the disadvantages of prior art remotely controlled steering systems. More specifically, because a remote control modification formed in accordance with the invention is more precise, over and understeering errors are minimized. Moreover, the likelihood of a loader or other earthmoving device incorporating the invention "slamming" into objects and operating in a dangerous manner is substantially reduced, if not entirely eliminated. These improvements result from the smaller outlet orifices of the remote control valve and the creation of hydraulic fluid pathways that allow the slave hydraulic actuator and, thus, the remote control valve to rapidly move to a neutral position when the electrically actuated valve is moved to its neutral position.

BRIEF DESCRIPTION OF THE DRAWINGS

The foregoing and other features and advantages of this invention will become more readily understood from the following detailed description when taken in conjunction with the attached drawing, which illustrates a preferred embodiment of the invention.

DESCRIPTION OF THE PREFERRED EMBODIMENT

The figure illustrates a remote control modification 11 formed in accordance with the invention connected to a hydraulic steering system 13 of the type commonly used in an underground loader. Prior to describing the remote control modification 11, a brief description of the loader hydraulic steering system 13 is provided.

The hydraulic steering system 13 includes a pair of hydraulic steering actuators 15 and 17, a manual control valve 19, and a pair of pressure relief valves 21 and 23. The manual control valve 19 is a bidirectional, spring-loaded valve whose position is manually controlled by an operator moving a lever arm 25. More specifically, one end of the lever arm 25 includes a handle 27. The other end 29 is hingedly attached to a shaft 31 connected to the piston of the manual control valve 19. Located between the hinged end 29 and the handle 27 of the arm 25, nearer the hinged end 29, is a protrusion 33. The protrusion forms a fulcrum for the arm 25. As a result, when the handle 27 is moved back and forth in the direction of the arrow 35, the shaft 31 is moved inwardly and outwardly with respect to the body of the manual control valve 19, thereby controlling the position of the piston of the manual control valve.

The piston of the manual control valve 19 includes pathways formed so as to couple a pair of inlet lines 35 and 37 to a pair of outlet ports 39 and 41. One of the inlet lines 35 is connected to a hydraulic manifold and the other inlet line 37 is connected to a fluid reservoir tank. As schematically illustrated by a pair of restrictors 43 and 45 in the figure, the outlet ports 39 and 41 have orifices that are restricted to a predetermined size. In a conventional manner, the pathways of the piston of the manual control valve 19 allow either of the inlet lines or 37 to be connected to either of the outlet ports 39 or 41. Which connection is made depends upon whether the arm 25 is in an extreme position in one direction or the other. In one extreme position, the left-most inlet line 35 is connected to the left-most outlet port 39 and the right-most inlet line 37 is connected to the right-most outlet port 41. In the other extreme position, the left-most inlet line 35 is connected to the right-most outlet port 41 and the right-most inlet line 37 is connected to the left-most outlet port 39. When in a neutral or center position, no connection is made between the inlet lines 35 and 37 and the outlet ports 39 and 41.

One of the outlet ports 39 of the manual control valve 19 is connected via a hydraulic line 47 to the non-shaft chamber 15a of one of the hydraulic steering actuator 15 and to the shaft chamber 17b of the other hydraulic steering actuator 17. The other outlet port 41 of the manual control valve 19 is connected via another hydraulic line 49 to the non-shaft chamber 17a of the second hydraulic steering actuator 17 and to the shaft chamber 15b of the first hydraulic steering actuator 15. The spring-loaded pressure relief valves 21 and 23 are connected in opposite polarity between the hydraulic lines 47 and 49 running between the outlet ports 39 and 41 of the manual control valve 19 and the hydraulic steering actuators 15 and 17. In a conventional manner, if excessively high hydraulic pressure occurs on the inlet side of either of the pressure relief valves 21 and 23, the over-pressured valve is opened, causing hydraulic fluid to flow from the high-pressure hydraulic line to the other (low pressure) hydraulic line.

As will be readily appreciated by those skilled in the hydraulic control system art, particularly the hydraulic steering control system art, when the lever arm 25 is pulled in one direction or the other to its extreme position, hydraulic fluid under pressure from a hydraulic manifold causes the shaft of one of these steering hydraulic actuators to extend and the shaft of the other steering hydraulic actuator to retract. As a result, the associated mechanism, i.e., the underground loader, is steered to turn in one direction or the other. The direction of steering is dependent upon the direction of movement of the lever arm 25. Movement of the lever arm in one direction causes a turn to the right when the wheels of the loader are rotated and movement of the lever arm in the other direction causes a turn to the left when the wheels of the loader are rotated.

As noted above, the use of an electrically operated device to simply move the piston of the manual control valve 19 in one direction or the other in accordance with the receipt of remote control signals in the same way the piston is moved by the lever arm 25 has not proven to be an effective way of remotely controlling the operation of the steering hydraulic actuators 15 and 17. Attempts of this type have resulted in the creation of remotely controlled steering mechanisms that are difficult to use and are often dangerous to personnel and other equipment. This is a direct result of the fact that the source of hydraulic fluid for many machines, such as underground loaders, only has available three different volume levels (gpm)—full throttle, half throttle, or idle. This means that hydraulic fluid volume control cannot be used to control steering. The invention avoids the problems associated with simply remotely controlling the position of the piston of the manual control valve 19 by adding the remote control modification 11 illustrated in the lower right of the figure. The remote control modification reduces the volumetric flow below that provided by the manual control valve.

The remote control modification 11 includes a remote control valve 51; a slave hydraulic actuator 53; first and second restrictor/reverse bypass pressure relief valve combinations 55 and 57; a three-position valve 59 operated by an electrically controlled actuator, namely, a solenoid 61; a receiver 63; and, a transmitter 65. Preferably, the remote control modification 11 also includes an adjustable restrictor 67. The remote control valve 51 includes a pair of input lines 71 and 73 each connected to one of the input lines 35 and 37 of the manual control valve 19. The remote control valve 51 also includes two output ports 75 and 77 each connected by a hydraulic line 79 and 81 to one of the hydraulic lines 47 and 49 connecting the output ports 39 and 41 of the manual control valve 17 to the steering hydraulic actuators 15 and 17. Thus, the remote control valve 51 is connected in parallel with the manual control valve 19. As with the outlet ports 39 and 41 of the manual control valve, the outlet ports 75 and 77 of the remote control valve 51 are restricted to a particular orifice size, as schematically denoted by restrictors 83 and 85.

The valve 59 controlled by the solenoid 61 includes a pair of inlet ports 86 and 87 and a pair of outlet ports 88 and 89. One inlet port 86 is connected to the source of hydraulic pressure, i.e., the manifold. The other inlet port 87 is connected to the hydraulic fluid reservoir, i.e., the tank. One of the outlet ports 88 is connected to one of the inlets of the slave hydraulic actuator 53 via the first restrictor/reverse bypass pressure relief valve combination 55, specifically the inlet of the slave cylinder 53 connected to the non-shaft chamber 53a of the slave hydraulic actuator. The other outlet port 89 of the solenoid-operated valve 59 is connected via the second restrictor/reverse bypass pressure relief valve combination 57 to the other inlet of the slave cylinder 53, i.e., the inlet connected to the shaft chamber 53b of the slave hydraulic actuator 53. The shaft 93 of the slave hydraulic actuator 53 and the shaft 95 of the remote control valve are longitudinally aligned and connected together by a coupling 97. As a result, movement of the shaft of the slave hydraulic actuator 53 controls the movement of the shaft of the remote control valve 51 and, thus, the position of the piston of the remote control valve 51.

The reverse bypass pressure relief valve portions 90 of the restrictor/reverse bypass pressure relief valve combinations 55 and 57 allow fluid to bypass the restrictors 91 in the reverse direction, i.e., from the slave hydraulic actuator 53 to the solenoid-operated valve 59. The movable element of the solenoid 61 and the piston of the solenoid-operated valve 59 are longitudinally aligned and connected together by a suitable mechanical linkage 101. Thus, the piston of the solenoid-operated valve 59 is moved back and forth when the solenoid 61 is energized, the direction of movement being determined by the polarity of the energization.

As illustrated in the figure, the piston of the solenoid-operated valve has three positions: a central or neutral position, a right position, and a left position. The piston is biased towards the center or neutral position by centering springs 103. In the center or neutral position, both outlet ports 88 and 89 are connected to the inlet port 87 running to the tank. In the right-most position, the manifold inlet 86 is connected to the first outlet port 88 and the tank inlet 87 is connected to the second outlet port 89. In the left-most position the manifold inlet 86 is connected to the second outlet port 89 and the first outlet port 88 is connected to the tank inlet 87. The manually adjustable restrictor 67 is mounted in a hydraulic line connected between the outlet of the solenoid-operated valve 59 connected to the non-shaft chamber 53a of the slave hydraulic actuator 53 and the tank, on the tank side of the first restrictor/reverse bypass pressure relief valve combination 55.

The receiver 63 is electrically connected to the solenoid 61. The remote transmitter 65 produces RF (radio frequency) signals 105 suitable for reception by the receiver 63. Preferably, the remote control transmitter 65 includes a joystick 107 or other suitable mechanism, such as a pair of switches, whose actuation produces RF signals that are interpreted by the receiver 63 in a manner that energizes the solenoid 61 so as to move the piston of the solenoid-operated valve 59 in one direction or the other. When no signal is received by the receiver 63 as a result of the joystick 107 being in a center position, for example, the springs 103 center the piston of the solenoid-operated valve 59.

In operation, when the joystick 107 or other operating mechanism of the remote transmitter 107 is actuated, i.e., moved in one direction or the other, an RF modulated signal 105 is sent to the receiver 63. In accordance with the signal the receiver 63 energizes the solenoid 61, causing the piston of the solenoid-operated valve 59 to move in one direction or the other. The direction of movement is determined by the nature of the RF signal. For example, the RF signal may be digitally encoded by the remote transmitter 65 and decoded by the receiver 63, with the nature of the code determining the direction of solenoid movement.

When energized, the solenoid 61 moves the piston of the solenoid-operated valve 59 to either its right or left position. As a result, hydraulic fluid produced by the manifold is applied to the chamber on one side or the other of the piston of the slave hydraulic actuator 53, causing the shaft of the slave hydraulic actuator 93 to move the piston of the remote control valve 51 in one direction or the other. As a result, hydraulic fluid pressure is applied to the chamber on one side of the piston of one of the hydraulic steering actuator 15 or 17 and the chamber on the other side of the piston of the other hydraulic steering actuator 15 or 17 in the same way that hydraulic pressure is applied to opposed chambers of the hydraulic steering actuators 15 and 17 by the manual control valve 19. Movement of the joystick 107 in the other direction causes the reverse operation, i.e., causes the remote transmitter 65 to produce an RF signal 105 that causes the solenoid 61 to move the piston of the solenoid-operated valve 59 in the opposite direction. As a result, the other chamber of the slave cylinder is hydraulically pressurized, causing the shaft 93 of the slave cylinder and the piston of the remote control valve 51 to move in the opposite direction. Such action causes hydraulic pressure to be applied to the other set of opposed chambers of the hydraulic steering actuators 15 and 17.

Because electric power to the solenoid 61 is immediately terminated when the RF control signal 105 terminates, the springs 103 of solenoid-operated valve 59 rapidly center the piston of the solenoid-operated valve 59. Rapid centering of the piston of the solenoid-operated valve 59 allows the springs of the remote control valve to rapidly center the piston of the remote control valve. Rapid centering occurs because the hydraulic pressure previously applied to one chamber of the slave hydraulic actuator immediately ends and because the reverse bypass pressure relief valves 90 of the restrictor/reverse bypass pressure relief valve combinations 55 and 57 provide a low restriction path to the tank. The absence of the reverse bypass pressure relief valves would mean that the only hydraulic fluid path to the tank would be through the restrictors 91, which would greatly increase the time required for the piston of the slave hydraulic actuator 53 to be centered. Centering of the piston of the slave hydraulic actuator is further enhanced by the tank return line containing the manually adjustable restrictor 67. More specifically, as will be readily appreciated by those familiar with hydraulic actuators, the non-shaft chamber of a hydraulic actuator has a greater volumetric capacity than does the shaft chamber. In the absence of any compensating mechanism, this difference in cavity volume will result in centering occurring more rapidly in one direction than the other. The invention compensates for the difference in cavity volume by providing an additional tank return path for the larger chamber.

One important feature of the invention is that the orifices of the outlet ports 75 and 77 of the remote control valve 51 are smaller in size than the outlet ports 39 and 41 of the manual control valve 19. In one actual embodiment of the invention wherein the inlet lines 35 and 37 were half-inch diameter lines and the steering cylinders 15 and 17 were 5-inch cylinders, the diameter of the outlet port orifices of the remote control valve 51 were one-eighth inch and the diameter of the outlet port orificies of the manual control valve 19 were three-sixteenths inch, i.e., the diameter of the outlet port orifices of the remote control valve were approximately two-thirds the diameter of the outlet port orifices of the manual control valve. This difference in size, plus the rapid centering of the piston of the remote control valve upon the termination of a steering signal produce a relatively smooth operating, hydraulic remote control steering system that overcomes the disadvantages of systems coupled directly to the piston of a manual control valve.

While a preferred embodiment of the invention has been illustrated and described, it will be appreciated that various changes can be made therein. For example, rather than being used with a steering system incorporating a pair of hydraulic steering actuators, the invention can be used with a steering system incorporating a single steering actuator. Further, the invention can be used with normally manually operable hydraulic control systems designed to perform functions other than steering, raising and lowering a bucket, for example. Consequently, within the scope of the appended claims, it is to be understood that the invention can be practiced otherwise than as specifically described herein.

The embodiments of the invention in which an exclusive property or privilege is claimed are defined as follows:

1. A hydraulic control system including a manual control valve having input and output ports for controlling the application of hydraulic pressure to one or more hydraulic actuators, the improvement comprising: a remote control modification, said remote control modification including:
   (a) a remote control valve having input and output ports connected in parallel with the input and output ports of said manual control valve, the output ports of said remote control valve being smaller in size than the output ports of said manual control valve; and,
   (b) an electro-hydraulic control system for controlling the operation of said remote control valve, said electro-hydraulic remote control system comprising:
   (i) a slave hydraulic actuator including: (1) a piston moved shaft coupled to said remote control valve for controlling the position of said remote control valve; and (2) chambers located on opposite sides of said piston such that said shaft passes through one of said chambers but not the other chamber;
   (ii) a three-position electrically actuated valve for controlling the flow of hydraulic fluid to said slave hydraulic actuator, said electrically actuated valve coupled to said slave hydraulic actuator such that: (1) hydraulic pressure is applied to the non-shaft chambers of said slave hydraulic actuator when said electrically actuated valve is in a first position; (2) hydraulic pressure is applied to the shaft chamber of said slave hydraulic actuator when said electrically actuated valve is in a second position; and (3) the shaft and non-shaft chambers of said slave hydraulic actuator are both connected to a hydraulic fluid reservoir when said electrically actuated valve is in said third position;
   (iii) a receiver coupled to said electrically actuated valve for energizing said electrically actuated valve so as to position said electrically actuated valve in one of said first and second positions upon receipt of a suitable remotely generated radio frequency signal; and,
   (iv) a remote transmitter for generating radio frequency signals suitable for causing said receiver to energize said electrically actuated valve so as to position said electrically actuated valve in one of said first and second positions.

2. The improvement claimed in claim 1, wherein said electrically actuated valve is spring-loaded to said third position.

3. The improvement claimed in claim 2, including restrictor/reverse bypass pressure relief valve combinations between said electrically actuated valve and said slave hydraulic actuator.

4. The improvement claimed in claim 3, wherein said remote control valve is spring-loaded to a position whereat the inlet and outlet ports of said remote control valve are unconnected.

5. The improvement claimed in claim 4, including a supplemental return line extending between the outlet of said electrically actuated valve coupled to the non-shaft chamber of said slave hydraulic actuator and said fluid reservoir tank.

6. The improvement claimed in claim 5, including a restrictor mounted in said supplemental return line.

7. The improvement claimed in claim 6, wherein said restrictor is manually adjustable.

8. The improvement claimed in claim 1, including restrictor/reverse bypass pressure relief valve combinations between said electrically actuated valve and said slave hydraulic actuator.

9. The improvement claimed in claim 8, wherein said remote control valve is spring-loaded to a position whereat the inlet and outlet ports of said remote control valve are unconnected.

10. The improvement claimed in claim 9, including a supplemental return line extending between the outlet of said electrically actuated valve coupled to the non-shaft chamber of said slave hydraulic actuator and said fluid reservoir tank.

11. The improvement claimed in claim 10, including a restrictor mounted supplemental return line.

12. The improvement claimed in claim 11, wherein said restrictor is manually adjustable.

13. The improvement claimed in claim 1, wherein said remote control valve is spring-loaded to a position whereat the inlet and outlet ports of said remote control valve are unconnected.

14. The improvement claimed in claim 13, including supplemental return line extending between the outlet of said electrically actuated valve coupled to the non-shaft chamber of said slave hydraulic actuator and said fluid reservoir tank.

15. The improvement claimed in claim 14, including a restrictor mounted in supplemental return line.

16. The improvement claimed in claim 15, wherein said restrictor is manually adjustable.

17. The improvement claimed in claim 1, including a supplemental return line coupled to the non-shaft chamber of said slave hydraulic actuator and said fluid reservoir tank.

18. The improvement claimed in claim 17, including a restrictor mounted supplemental return line.

19. The improvement claimed in claim 18, wherein said restrictor is manually adjustable.

* * * * *

UNITED STATES PATENT AND TRADEMARK OFFICE
CERTIFICATE OF CORRECTION

PATENT NO. : 5,014,596

DATED : May 14, 1991

INVENTOR(S) : Louis G. St. Martin

It is certified that error appears in the above-identified patent and that said Letters Patent is hereby corrected as shown below:

| COLUMN | LINE | |
|---|---|---|
| 1 | 26 | delete "rear of aft" and insert therefor --rear or aft-- |
| 2 | 13 | delete "enotgh" and insert therefor --enough-- |
| 3 | 52 | after "lines" insert --35-- |
| 7 | 13 | delete "orificies" and insert therefor "orifices" |
| 8 | 62 | after "including" insert --a-- |
| 8 | 68 | after "mounted in" insert --said-- |
| 10 | 4 | after "mounted" insert --in said-- |

Signed and Sealed this

Twelfth Day of January, 1993

Attest:

DOUGLAS B. COMER

*Attesting Officer*     Acting Commissioner of Patents and Trademarks